Aug. 25, 1925.
F. A. KING
1,551,034
WINDSHIELD SPOTLIGHT MOUNTING
Filed April 4, 1922
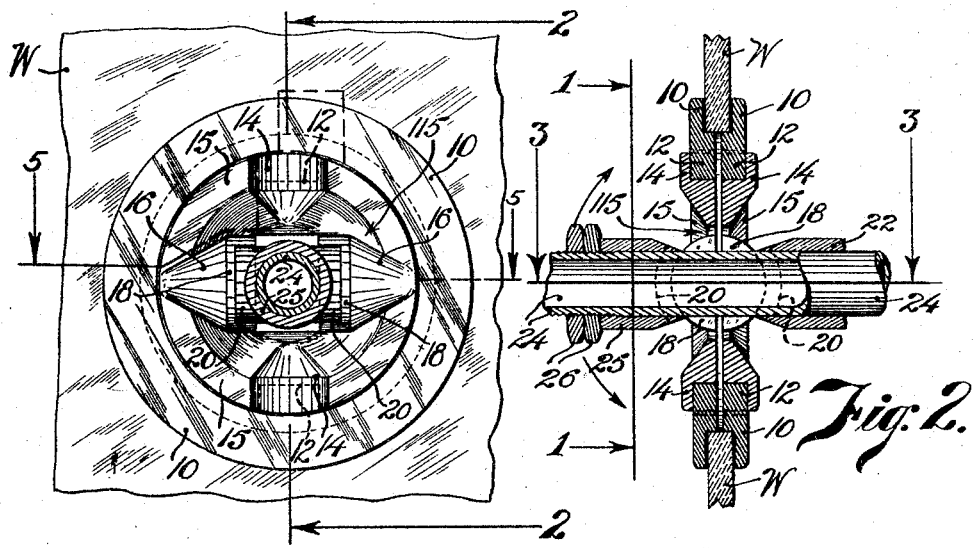
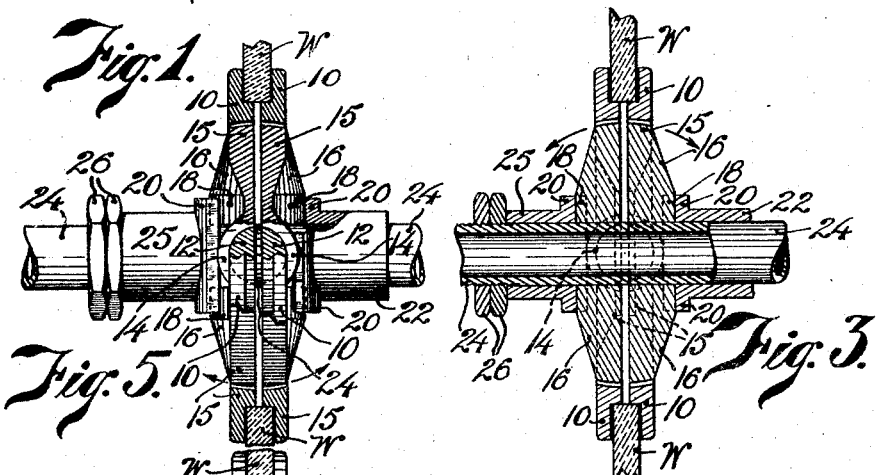
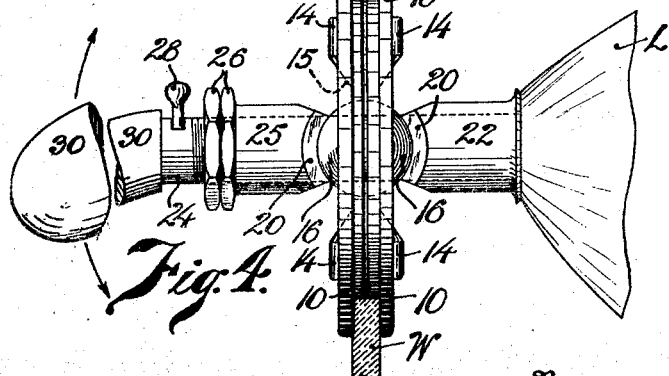
Inventor
F. A. King.
By Lynn L. Steele
Attorney Patented Aug. 25, 1925.

1,551,034

UNITED STATES PATENT OFFICE.

FRANK A. KING, OF ENGLEWOOD, COLORADO.

WINDSHIELD-SPOTLIGHT MOUNTING.

Application filed April 4, 1922. Serial No. 549,523.

*To all whom it may concern:*

Be it known that I, FRANK A. KING, a citizen of the United States, and resident of Englewood, in the county of Arapahoe, State of Colorado, have invented certain new and useful Improvements in Windshield-Spotlight Mountings; and I do declare the following to be a full, clear, and exact description of the invention, such as will enable others skilled in the art to which it appertains to make and use the same, reference being had to the accompanying drawings, which form a part of this specification.

The object of this invention is to provide a novel and efficient mounting for spotlights whereby the same may be mounted within an aperture in a windshield or the like of an automobile for ready adjustment of the light by the driver without reaching outside the machine.

Briefly the invention comprises a pair of rings for engagement with the opposite sides of the windshield and having a pair of inwardly directed pins or bearings adapted to engage in seats carried by a pair of opposed rings or plates which in turn have a pair of inwardly directed lugs or bearings, set at right angles to the first mentioned bearings, which are adapted to engage within seats carried by a stem which is thereby shiftable and which carries the spotlight. In this manner a sort of universal joint is obtained whereby the spotlight may be moved to any angle of adjustment desired.

In the accompanying drawings wherein one embodiment of the invention is disclosed, Fig. 1 is an elevation of the mounting;

Fig. 2 is a vertical section therethrough taken on line 2—2 of Fig. 1;

Fig. 3 is a transverse section taken on line 3—3 of Fig. 2;

Fig. 4 is a side elevation indicating the spotlight location;

Fig. 5 is an irregular horizontal section taken on the irregular line 5—5 of Fig. 1.

A glass windshield W is provided with an aperture in which there is mounted the shouldered portions of a pair of rings 10 having flanges engaging the opposite sides of the windshield. Each ring 10 has a pair of diametrically opposed pins or studs 12 which are approximately semi-cylindrical, so that the adjacent pins of the two rings constitute a cylindrical bearing at each side of the device. The two sets of studs or bearings 12 thus formed are received in bearing seats 14 carried by circular plates 15 which are recessed or beveled as at 115 as they extend toward their centers, said plates 15 being adapted to swing within the rings 10 upon the axis determined by the studs or bearings 12.

At right angles to the axis of the studs 12, each plate 15 is provided with opposed partially conical lugs or bosses 16 having bases 18 whereby the adjacent bases 18 of the two plates form diametrically opposed approximately cylindrical bearings rotatable within partially cylindrical seats 20 in the form of upstanding segments carried by two sleeves 22 and 25 mounted upon a stem or spindle 24 on opposite sides of the device. The spindle 24 carries the casing L of the spotlight, and the sleeve 22 either bears at its outer end against the light casing L as in Fig. 4 or is secured to the spindle 24, while the sleeve 25 is slidable along the spindle and is held in adjusted position by means of tensioning lock nuts 26 threaded on the spindle. In this manner adjustment of the nuts 26 binds the seats 20 against the bases 18 of bosses 16 thus forcing the seats 14 on plates 15 into frictional engagement with the studs 12 and causing the rings 10 to bind upon the windshield W. Thus the amount of tension or friction desired to hold the parts in set position may be readily produced. The spindle 24 may have a switch 28 for controlling the flow of current through conductors carried within the spindle, and may have an operating handle 30. By making the switch 28 and handle 30 removable, the entire device may be quickly removed from its position on the windshield by removing the nuts 26 from the spindle, the various parts being then readily separable.

By grasping the handle 30, the same may be swung vertically by rotation of the seats 20 upon the bases 18 in the direction of the arrows of Figs. 2 and 4 until the beveled inner ends of the sleeves 22 and 25 engage the beveled portions 115 of plates 15. Swinging in a horizontal direction as indicated by small arrows of Figs. 3 and 5 may also be had, the plates 15 rotating within the rings 10 upon the pivoting studs or pins 12, until the sleeves 22 and 25 strike the rings 10, Thus any desired angle of adjustment of the light may be had by combining the two movements, and when the light is directed straight ahead or approximately so the plates 15 lie within the outlines of the rings 10 and close the latter against passage of a draft. The light mounting is comparatively simple and very efficient, and any required amount of tension or friction within the parts may be readily had by merely adjusting the nuts 26 upon the light carrying spindle 24.

I claim:

1. In combination, a support for a light having an aperture therein, a pair of members engaging the opposite sides of said support at said aperture and both having bearings, a second pair of members engaging the outer faces of said bearings on opposite sides and adapted to swing thereon, a second set of bearings on said second pair of members and carried by both thereof, and light-carrying means passing through said aperture and having means engaging opposite outer faces of said second set of bearings whereby said engaging means binds all the parts together and maintains their position on the windshield.

2. In combination, a support for a light having an aperture therein, a pair of members engaging opposite faces of said support at said aperture, both of said members having radially disposed inwardly directed bearings, a second pair of members rotatably engaging the outer faces of said bearings on opposite sides, a second set of radially disposed inwardly directed bearings provided on both of said second pair of members, means rotatably engaging the outer faces of said second bearings on opposite sides, and a light-carrier secured to said means and passing through said aperture.

3. In combination, a support for a light having an aperture therein, a pair of members engaging opposite faces of said support at said aperture, a second pair of members engaging outer faces of portions of opposite sides of the first pair of members, light-carrying means engaging opposite outer faces of portions of the second pair of members, and means for adjustably positioning said means to vary the pressure of said means and the frictional engagement of the various parts.

4. In combination, a support for a light having an aperture therein, a pair of members engaging opposite faces of said support at said aperture, a second pair of members engaging outer faces of the first pair of members and rotatable thereupon, means rotatably engaging opposite outer faces of portions of said second pair of members, a light carrier supported by said means and passing through said aperture, and a pressure adjusting device for said means, whereby the parts are held on the support and in any set position.

5. In combination, a support for a light having an aperture therein, a pair of members engaging opposite faces of said support at said aperture, a second pair of members engaging outer portions of said first pair of members and rotatable upon said portions, opposite means rotatably engaging opposite outer portions of said second pair of members, and a light carrier supported by said means and passing through said aperture.

6. In combination, a support having an aperture therein, a pair of rings connected with said support, a pair of plates pivoted on said rings on spaced pivots and normally closing the latter, and a light carrier pivoted on said plates and projecting therethrough.

In testimony whereof I affix my signature.

FRANK A. KING.